US008394645B2

(12) United States Patent
Beebe et al.

(10) Patent No.: US 8,394,645 B2
(45) Date of Patent: Mar. 12, 2013

(54) METHOD FOR PERFORMING A HIGH THROUGHPUT ASSAY

(75) Inventors: David J. Beebe, Monona, WI (US); Ivar Meyvantsson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/409,626

(22) Filed: Mar. 1, 2012

(65) Prior Publication Data

US 2013/0037115 A1 Feb. 14, 2013

Related U.S. Application Data

(62) Division of application No. 11/124,936, filed on May 9, 2005, now Pat. No. 8,168,133.

(51) Int. Cl.
*G01N 21/75* (2006.01)

(52) U.S. Cl. ....... 436/180; 422/401; 422/417; 422/68.1; 422/501; 73/53.01

(58) Field of Classification Search .................. 436/180; 422/401, 417, 68.1, 501; 73/53.01
See application file for complete search history.

(56) References Cited

U.S. PATENT DOCUMENTS

| | | | |
|---|---|---|---|
| 6,695,765 | B1 | 2/2004 | Beebe et al. |
| 2002/0182747 | A1 | 12/2002 | Beebe et al. |
| 2003/0132112 | A1 | 7/2003 | Beebe et al. |
| 2004/0152200 | A1 | 8/2004 | Deshmukh |

OTHER PUBLICATIONS

Fredrickson et al, "Macro-to-Mirco Interfaces for Microfluidic Devices", Miniaturization for Chemistry, Biology & Bioengineering, vol. 4, pp. 536-533, Jul. 13, 2004.
Weigl et al, "Well-Plate Formats and Microfluidics-Applications of Laminar Fluid Diffusion Interfaces to HTP Screening", Micro Total Analysis Systems 2001, pp. 383-384.

*Primary Examiner* — Lyle Alexander
(74) *Attorney, Agent, or Firm* — Boyle Fredrickson, S.C.

(57) ABSTRACT

A device and method is provided for performing a high throughput assay. The device includes a plate structure having a plate and a plurality of microfluidic structures positioned thereon. Each microfluidic structure defines a channel having an input and an output. At least one of the input and the output of the channel of each of the plurality of mircofluidic structures includes a first plurality of ports. In operation, the channels are filled with fluid and pressure gradients are generated between the fluids at the inputs and the fluids at the outputs of the channels. As a result, fluid flows through the channels toward the outputs.

7 Claims, 3 Drawing Sheets

FIG. 1
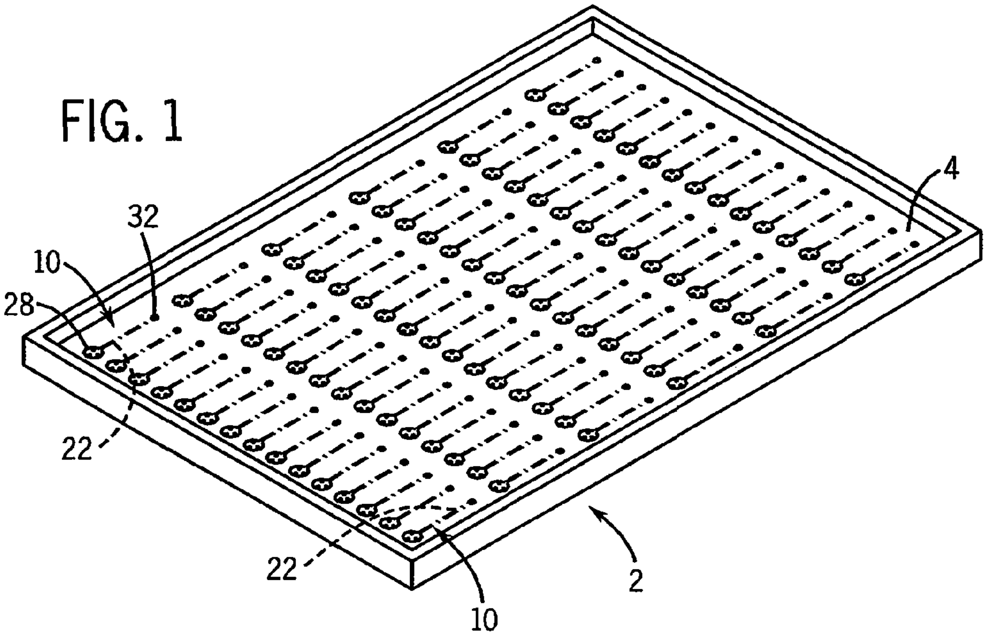
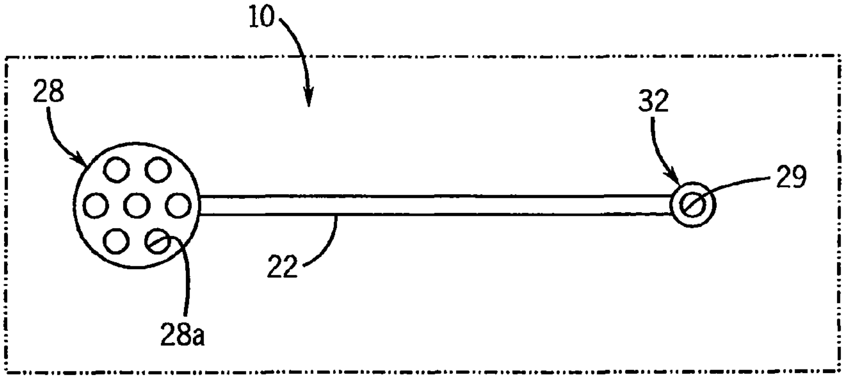
FIG. 2
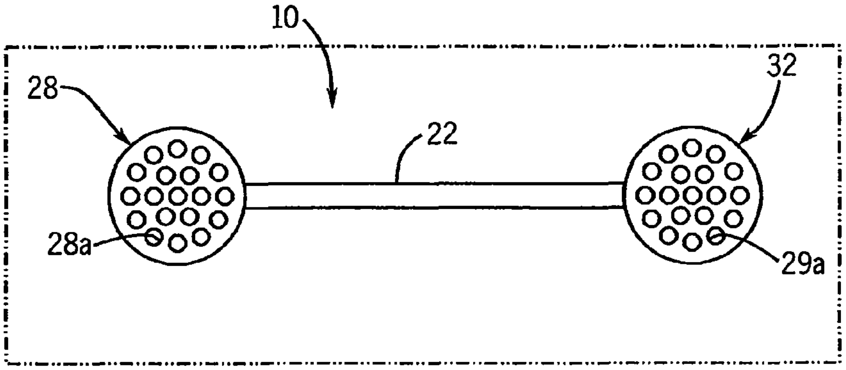
FIG. 9

METHOD FOR PERFORMING A HIGH THROUGHPUT ASSAY

CROSS-REFERENCE TO RELATED APPLICATION

This application is a divisional of Ser. No. 11/124,936, filed May 9, 2005, now U.S. Pat. No. 8,168,133.

REFERENCE TO GOVERNMENT GRANT

This invention was made with government support awarded under W81XWH-04-1-0572 awarded by the ARMY/MRMC. The government has certain rights in the invention.

FIELD OF THE INVENTION

This invention relates generally to microfluidic devices, and in particular, to a microfluidic device and method for performing high throughput assays utilizing commercially available liquid handling robotics.

BACKGROUND AND SUMMARY OF THE INVENTION

One of the central paradigms of modern drug discovery is high throughput screening (HTS), which is the heart of lead discovery programs in the pharmaceutical industry. HTS involves the execution of a large number of assays where hypothetical drug targets are exposed to a library of small molecules. As these programs have developed, the number of assays that need to be performed has increased dramatically. Combinatorial chemistry has been applied to make an extraordinary variety of small molecule themes, and numerous potential targets have emerged from functional genomics.

In view of the foregoing, an ongoing need for improved screening technology has developed in order to hold back the cost and time consumption requirements of prior HTS systems. The introduction of high-density, low volume formats addresses both issues. The industry has gradually been incorporating miniaturized microtiter plate based technology. The necessary liquid handling and readout devices for 384, 1536 and 3456-well plates are commercially available. The first choice tends to be 1536 well plates, but 3456 and 384 well plates are also used, the latter often being preferred for cellular assays. Assay volumes in 384 well plates range down to 10 microliters and for 1536 well plates down to 1 microliter. Applications of 9600 well plates with assay volumes down to 0.2 microliters have been reported.

The assays employed in HTS fall into two categories: homogeneous and heterogeneous assays. The former involve only fluidic additions, incubations and reading. In addition to these operations, heterogeneous assays may require washing, filtering or centrifugation. Each category of HTS has its own pros and cons. While heterogeneous assays take more time to perform and require more complex robotics to automate, they generally provide higher quality data and are easier to develop. Heterogeneous assays can be developed for any analyte for which either a binding protein or an antibody exists. This is very important considering that assay development is often the rate limiting step in the lead discovery process.

An alternative approach towards further assay miniaturization is microfluidics. There have been numerous attempts to provide the valving and the mixing functionality necessary to enable an entire assay to be performed within a microfluidic system. Practically all of these prior attempts at providing a functional microfluidic system require the continuous flow of a fluid through a channel of a microfluidic device. Consequently, several non-traditional pumping methods have been developed for pumping fluid through a channel of a microfluidic device, including some which have displayed promising results. However, the one drawback to almost all pumping methods is the requirement for expensive and/or complicated external equipment, be it the actual pumping mechanism (e.g., syringe pumps), or the energy to drive the pumping mechanism (e.g., power amplifiers). The ideal device for pumping fluid through a channel of a microfluidic device would be semi-autonomous and would be incorporated totally at the microscale.

The most popular method of moving a fluid through a channel of a microfluidic device is known as electrokinetic flow. Electrokinetic flow is accomplished by conducting electricity through the channel of the microfluidic device in which pumping is desired. While functional in certain applications, electrokinetic flow is not a viable option for moving biological samples through a channel of a microfluidic device. The reason is twofold: first, the electricity in the channels alters the biological molecules, rendering the molecules either dead or useless; and second, the biological molecules tend to coat the channels of the microfluidic device rendering the pumping method useless. Heretofore, the only reliable way to perform biological functions within a microfluidic device was by using pressure-driven flow. Therefore, it is highly desirable to provide a more elegant and efficient method of pumping fluid through a channel of a microfluidic device.

It can be appreciated that one of the benefits of using microfluidic channels to perform assays is that only a small fraction of the liquid surface is exposed to the atmosphere. This reduces evaporation, which is a serious problem associated with low-volume microtitre plate assays. A few microfluidics-based HTS solutions are commercially available, but all require investment in specialized hardware for reagent introduction and readout. As such, it is highly desirable to provide a microfluidic system that is compatible with conventional microplate pipetting workstations.

Therefore, it is a primary object and feature of the present invention to provide a device and method for performing high throughput assays that utilize commercially available liquid handling robotics.

It is a further object and feature of the present invention to provide a device and method for performing high throughput assays that are simple and inexpensive.

It is a still further object and feature of the present invention to provide a method for performing a high throughput assay the may be performed more quickly than and with a fraction the fluids required in prior methods.

In accordance with the present invention, a device is provided for performing an assay. The device includes a plate structure having a channel therein. The channel has an input and an output. A plurality of ports are provided in the input of the channel.

The plate structure includes a plate having an upper surface. The channel is provided in a first microfluidic structure positioned on the upper surface of the plate. The first microfluidic structure includes an upper surface that is hydrophobic. The plate structure includes a second microfludic structure positioned on the upper surface of the plate. The second microfluidic structure defines a channel having an input and an output. The input of the channel of the second microfluidic structure has a plurality of ports. In addition, the output of the channel of the second microfluidic structure may include a plurality of output ports. The device may include a liquid dispensing instrument that extends along an axis. It is contemplated for the input of the channel to be axially aligned with the liquid dispensing instrument.

In accordance with a further aspect of the present invention, a device is provided for performing a high throughput assay. The device includes a plate and a plurality of microfluidic structures thereon. Each microfluidic structure defines a channel having an input and an output. At least one of the inputs and the outputs of the channels of the plurality of mircofluidic structures includes a first plurality of ports.

Each of the plurality of microfluidic structures includes an upper surface that is hydrophobic. It is contemplated for the plurality of microfluidic structures to be removable from the plate. Further, each of the outputs of the channels of the plurality of microfluidic structures may include a plurality of output ports. A liquid dispensing instrument deposits drops along a plurality of generally parallel axis. Each axis extends through a corresponding input of the channels of the plurality of microfluidic structures.

In accordance with a still further aspect of the present invention, a method of pumping fluid is provided. The method includes providing a microfluidic device having a channel therethough. The channel has a plurality of input ports and an output. The channel is filled with fluid and a pressure gradient is generated between the fluid at the input ports and the fluid at the output port such that the fluid flows through the channel towards the output. It is contemplated for the output of channel to include a plurality of output ports.

The pressure gradient is generated by depositing a reservoir drop of fluid over the output of the channel of sufficient dimension to overlap the output and by sequentially depositing pumping drops of fluid at the input ports of the channel. Each of the pumping drops has a predetermined radius. The reservoir drop has a radius greater than the radii of the pumping drops and greater than the predetermined radius of the output of the channel. The channel through the microfluidic device has a resistance and each of the pumping drops has a radius and a surface free energy. The reservoir drop has a height and a density such that fluid flows through the channel at a rate according to the expression:

$$\frac{dV}{dt} = \frac{1}{Z}\left(\rho gh - \frac{2\gamma}{R}\right)$$

wherein: dV/dt is the rate of fluid flowing through the channel; Z is the resistance of the channel; $\rho$ is the density of the reservoir drop; g is gravity; h is the height of the reservoir drop; $\gamma$ is the surface free energy of the pumping drops; and R is the radius of the pumping drops.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a isometric view of a plate incorporating a plurality of microfluidic devices in accordance with the present invention;

FIG. 2 is a top plan view of a first embodiment of the microfluidic device of the present invention;

FIG. 9 is a top plan view of an alternate embodiment of the microfluidic device of the present invention.

DETAILED DESCRIPTION OF THE DRAWINGS

Figure 3:
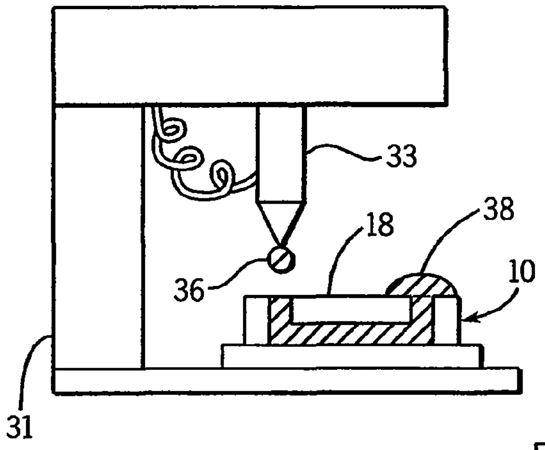
FIG. 3. is a schematic view of a robotic micropipetting station for depositing drops of liquid on the upper surface of the microfluidic device of FIG. 2.

Referring to FIG. 1, a microtiter plate for use in the methodology of the present invention is generally designated by the reference numeral 2. Plate 2 includes upper surface 4 adapted for receiving a plurality of microfluidic devices 10 thereon. Microfluidic devices 10 may be fabricated collectively on upper surface 4 of plate 2 or individually. Further, a sheet of microfluidic devices 10 may be fabricated and positioned on plate 2 without deviating from the scope of the present invention or integrally molded with plate 2. It is intended for microfluidic devices 10 to be used in the performance of high throughput screening (HTS). It is preferred that plate 2 include a predetermined number of microfluidic devices 10 thereon corresponding to the number of wells in a standard microtiter well plate. By way of example, plate 2 may include any number of microfluidic devices 10 thereon, such as 384, 1546 or 3456, without deviating from the scope of the present invention.

Figure 4:
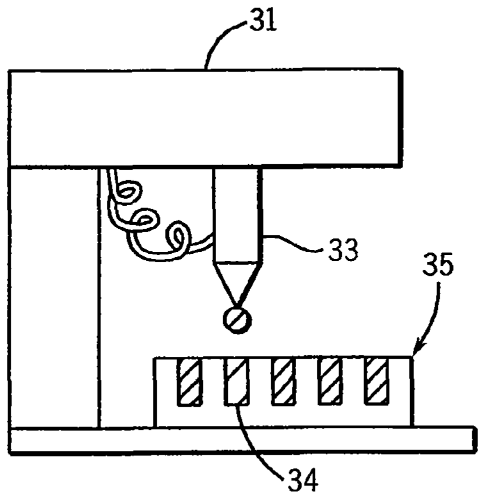
FIG. 4 is a schematic view of the robotic micropipetting station of FIG. 3 depositing drops of liquid in a well of a multi-well plate.
Figure 5:
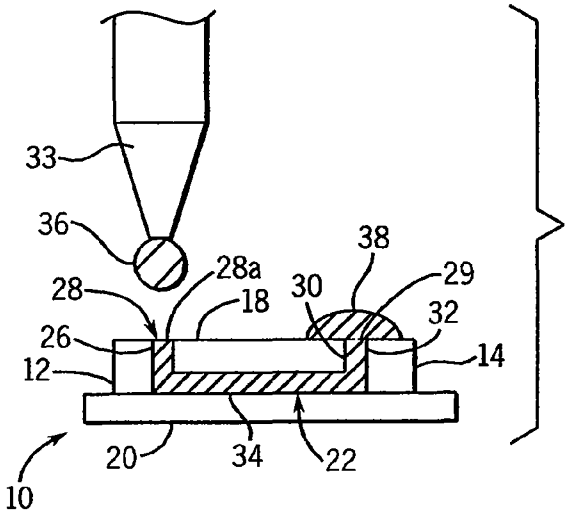
FIG. 5 is an enlarged, schematic view of the robotic micropipetting station of FIG. 3 showing the depositing of a drop of liquid on the upper surface of the microfluidic device of the present invention by a micropipette.
Figure 6:
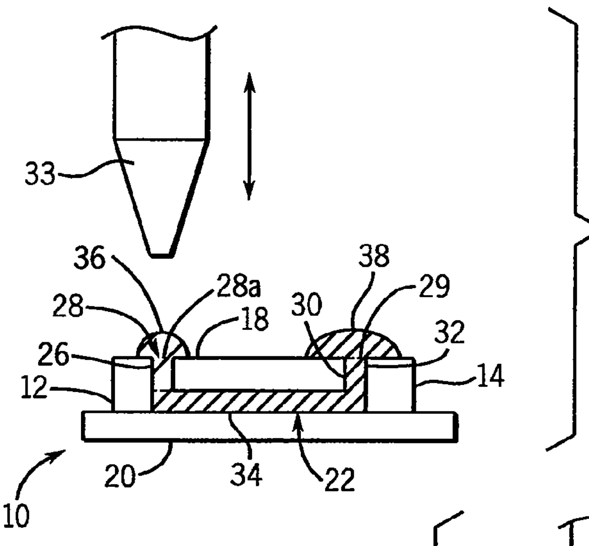
FIG. 6 is a schematic view, similar to FIG. 5, showing the drop of liquid deposited on the upper surface of the microfluidic device by the micropipette.
Figure 7:
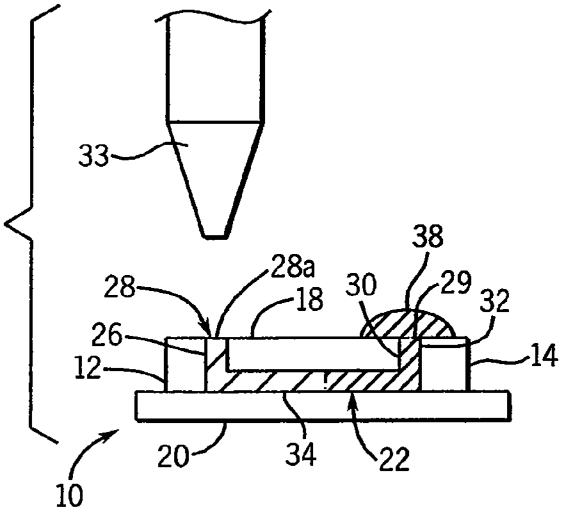
FIG. 7 is a schematic view, similar to FIGS. 5 and 6, showing the drop of liquid flowing into a channel of the microfluidic device by the micropipette.
Figure 8:
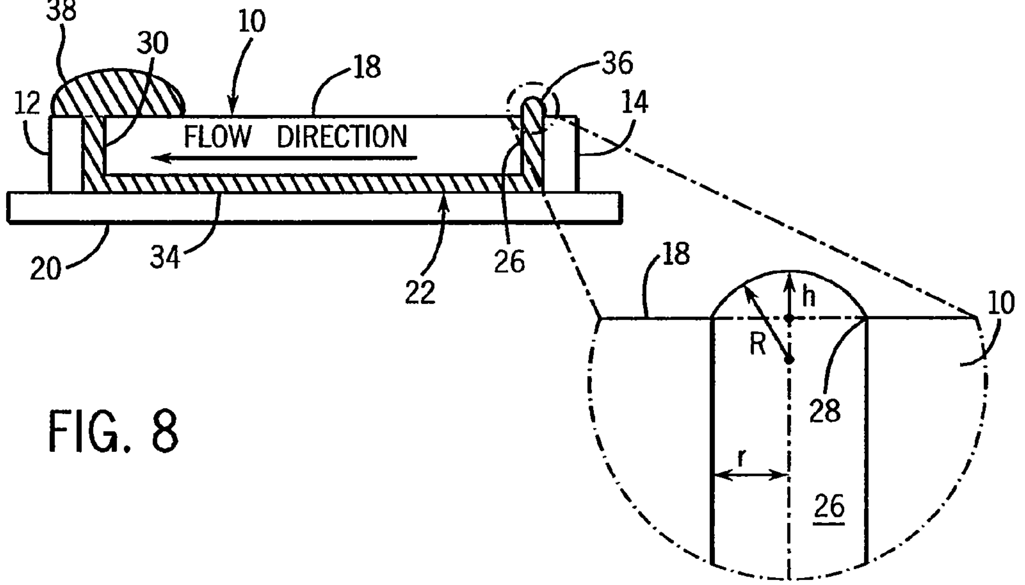
FIG. 8 is an enlarged, schematic view showing the dimensions of the drop of liquid deposited on the upper surface of the microfluidic device by the micropipette.

As best seen in FIG. 1, each microfluidic device 10 is identical in structure, and as such, the description hereinafter of microfluidic device 10 is understood to described all of the microfluidic devices depicted in FIG. 1 as if fully described herein. Referring to FIGS. 2-8, microfluidic device 10 may be formed from polydimethylsiloxane (PDMS), for reasons hereinafter described, and has first and second ends 12 and 14, respectively, and upper and lower surfaces 18 and 20, respectively. Channel 22 extends through microfluidic device 10 and includes a first vertical portion 26 terminating at an input 28 that communicates with upper surface 18 of microfluidic device 10 and a second vertical portion 30 terminating at an output 32 also communicating with upper surface 18 of microfluidic device 10. First and second vertical portions 26 and 30, respectively, of channel 22 are interconnected by and communicate with horizontal portion 34 of channel 22. The dimension of channel 22 connecting input 28 and output 32 is arbitrary.

Referring to FIG. 2, input 28 is defined by a plurality of pores or input ports 28*a*. Input ports 28*a* of input 28 communicate with the interior of channel 22 for reasons hereinafter described. Output 32 of channel 22 may comprise a single opening 29 communicating with the interior of channel 22, FIG. 2. Alternatively, output 32 may includes a plurality of pores or output ports 29*a*, FIG. 9.

A robotic micropipetting station 31 is provided and includes a liquid dispensing instrument such as micropipette 33 for depositing drops of liquid, such as pumping drop 36 and reservoir drop 38, on upper surface 18 of microfluidic device 10, for reasons hereinafter described. Modern high-throughput systems, such as robotic micropipetting station 31, are robotic systems designed to position micropipette 33 at a predetermined location above a microtiter well plate. In the present embodiment, it is intended for micropipetting station 31 to position micropipette 33 over input 28 and/or output 32 of a predetermined microfluidic device 10, FIGS. 3-4, and to dispense or withdraw a drop into one of the input ports 28*a* of input 28 or out of output 32, respectively, of channel 22 of microfluidic device 10 with a high degree of speed, precision, and repeatability.

The amount of pressure present within a pumping drop 36 of liquid at an air-liquid interface is given by the Young-LaPlace equation:

$$\Delta P=\gamma(1/R1+1/R2) \qquad \text{Equation (1)}$$

wherein $\gamma$ is the surface free energy of the liquid; and R1 and R2 are the radii of curvature for two axes normal to each other that describe the curvature of the surface of pumping drop 36.

For spherical drops, Equation (1) may be rewritten as:

$$\Delta P=2\gamma/R \qquad \text{Equation (2)}$$

wherein: R is the radius of the spherical pumping drop 36, FIG. 8.

From Equation (2), it can be seen that smaller drops have a higher internal pressure than larger drops. Therefore, if two drops of different size are connected via a fluid-filled tube (i.e. channel 22), the smaller drop will shrink while the larger one grows in size. One manifestation of this effect is the pulmonary phenomenon called "instability of the alveoli" which is a condition in which large alveoli continue to grow while smaller ones shrink. In view of the foregoing, it can be appreciated that fluid can be pumped through channel 22 by using the surface tension in pumping drop 36, as well as, input ports 28*a* of input 28 and opening 29 of output 32 of channel 22.

In accordance with the pumping method of the present invention, fluid is provided in channel 22 of microfluidic device 10. Thereafter, micropipette 33 is axially aligned with output 32. Reservoir drop 38 (e.g., 100 μL), is deposited by micropipette 33 over output 32 of channel 22, FIG. 5. The radius of reservoir drop 38 is greater than the radius of opening 29 in output 32 and is of sufficient dimension that the pressure at output 32 of channel 22 is essentially zero. In order to perform the methodology of the present invention with smaller volumes of fluid, it is contemplated to provide a plurality of output ports 29*a* in output 32. Output ports 29*a* of output 32, FIG. 9, have smaller radii than opening 29 in output 32, FIG. 2, thereby allowing the use of a smaller reservoir drop. Further, by providing multiple output ports 29*a* in output 32, the margin of error associated the depositing of reservoir drop 38 on one of the output ports 29*a* of output 32 by micropipette 33 is increased.

Micropipette 33 is axially aligned with input 28. Pumping drop 36, of significantly smaller dimension than reservoir drop 38, is deposited on one of the input ports 28*a* of input 28 of channel 22, FIGS. 6 and 8, by micropipette 33 of robotic micropipetting station 31, FIG. 5. It can be appreciated by providing multiple input ports 28*a* in input 28, the margin of error associated the depositing of pumping drop 36 on one of the input ports 28*a* of input 28 by micropipette 33 is increased. Pumping drop 36 may be hemispherical in shape or may be other shapes. As such, it is contemplated that the shape and the volume of pumping drop 36 be defined by the hydrophobic/hydrophilic patterning of the surface surrounding input port 28*a* of input 28 in order to extend the pumping time of the method of the present invention. As heretofore described, microfluidic device 10 is formed from PDMS which has a high hydrophobicity and has a tendency to maintain the hemispherical shapes of pumping drop 36 and reservoir drop 38 on input and output 28 and 32, respectively. It is contemplated as being within the scope of the present invention that the fluid in channel 22, pumping drops 36 and reservoir drop 38 be the same liquid or different liquids.

Because pumping drop 36 deposited on one of the input ports 28*a* of input 28 has a smaller radius than reservoir drop 38, a larger pressure exists on the one of the input ports 28*a* of input 28 of channel 22. The resulting pressure gradient causes the pumping drop 36 to flow from the one of the input ports 28*a* of input 28 through channel 22 towards reservoir drop 38 over opening 29 of output 32 of channel 22, FIG. 7. It can be understood that by sequentially depositing additional pumping drops 36 on an input port 28*a* of input 28 of channel 22 by micropipette 33 of robotic micropipetting station 31, the resulting pressure gradient will cause the pumping drops 36 deposited on the input ports 28*a* of input 28 to flow through channel 22 towards reservoir drop 38 over opening 29 of output 32 of channel 22. As a result, fluid flows through channel 22 from input 28 to output 32.

Referring back to FIG. 8, the highest pressure attainable for a given radius, R, of an input port 28*a* of input 28 of channel 22 is a hemispherical drop whose radius is equal to the radius, r, of an input port 28*a* of input 28 of channel 22. Any deviation from this size, either larger or smaller, results in a lower pressure. As such, it is preferred that the radius of each pumping drop 36 be generally equal to the radius of an input port 28*a* of input 28. The radius (i.e., the radius which determines the pressure) of pumping drop 36 can be determined by first solving for the height, h, that pumping drop 36 rises above a corresponding port, i.e., an input port 28*a* of input 28 of channel 22. The pumping drop 36 radius can be calculated according to the expression:

$$R=\left[\frac{3V}{\pi}+h^3\right]\frac{1}{3h^2} \qquad \text{Equation (3)}$$

wherein: R is the radius of pumping drop 36; V is the user selected volume of the first pumping drop; and h is the height of pumping drop 36 above upper surface 18 of microfluidic device 10.

The height of pumping drop 36 of volume V can be found if the radius of the spherical cap is also known. In the present application, the radius of an input port 28*a* of input 28 is the spherical cap radius. As such, the height of pumping drop 36 may be calculated according to the expression:

$$h=\frac{1}{6}\left[108b+12(12a^3+81b^2)^{\frac{1}{2}}\right]^{\frac{1}{3}}-\frac{2a}{\left[108b+12(12a^3+81b^2)^{\frac{1}{2}}\right]^{\frac{1}{3}}} \qquad \text{Equation (4)}$$

wherein: $a=3r^2$ (r is the radius of input port 28*a*); and $b=6V/\pi$ (V is the volume of pumping drop 36 placed on input port 28*a*).

The volumetric flow rate of the fluid flowing from input 28 of channel 22 to output 32 of channel 22 will change with respect to the volume of pumping drop 36. Therefore, the volumetric flow rate or change in volume with respect to time can be calculated using the equation:

$$\frac{dV}{dt} = \frac{1}{Z}\left(\rho g h - \frac{2\gamma}{R}\right) \quad \text{Equation (5)}$$

wherein: dV/dt is the rate of fluid flowing through channel 22; Z is the flow resistance of channel 22; ρ is the density of pumping drop 36; g is gravity; h is the height of reservoir drop 38; γ is the surface free energy of pumping drop 36; and R is the radius of the pumping drops 36.

It is contemplated that various applications of the method of the present invention are possible without deviating from the present invention. By way of example, multiple inputs could be formed along the length of channel 22. By designating one of such inputs as the output, different flow rates could be achieved by depositing pumping drops on different inputs along length of channel 22 (due to the difference in channel resistance). In addition, temporary outputs 32 may be used to cause fluid to flow into them, mix, and then, in turn, be pumped to other outputs 32. It can be appreciated that the pumping method of the present invention works with various types of fluids including water and biological fluids.

Further, it is contemplated to etch patterns in upper surface 18 of microfluidic device 10 about the outer peripheries of input 28 and/or output 32, respectively, in order to alter the corresponding configurations of pumping drop 36 and reservoir drop 38 deposited thereon. By altering the configurations of pumping and reservoir drops 36 and 38, respectively, it can be appreciated that the volumetric flow rate of fluid through channel 22 of microfluidic device 10 may be modified. In addition, by etching the patterns in upper surface 18 of microfludic device 10, it can be appreciated that the time period during which the pumping of the fluid through channel 22 of microfluidic device 10 takes place may be increased or decreased to a user desired time period.

As described, there are several benefits to use of the pumping method of the present invention. By way of example, the pumping method of the present invention allows high-throughput robotic assaying systems to directly interface with microfluidic device 10 and pump liquid using only micropipette 33. In a lab setting, manual pipettes can also be used, eliminating the need for expensive pumping equipment. Because the method of the present invention relies on surface tension effects, it is robust enough to allow fluid to be pumped in microfluidic device 10 in environments where physical or electrical noise is present. The pumping rates are determined by the volume of pumping drop 36 present on input 28 of the channel 22, which is controllable to a high degree of precision with modern robotic micropipetting stations 31. The combination of these factors allows for a pumping method suitable for use in a variety of situations and applications.

Various modes of carrying out the invention are contemplated as being within the scope of the following claims particularly pointing out and distinctly claiming the subject matter, which is regarded as the invention.

We claim:

1. A method of pumping fluid, comprising the steps of:

providing a microfluidic device having a channel therethough, the channel having a diameter, an input and an output;

providing an input plate at the input of the channel, the input plate having a diameter generally equally to the diameter of the channel at the input thereof, an inner surface communicating with the channel, an outer surface and a plurality of input ports extending between the inner and outer surfaces of the input plate and communicating with the channel, each input port having a diameter less than the diameter of the channel at the input and being axially aligned with the input of channel;

filing the channel with fluid; and generating a pressure gradient between the fluid at the input ports and the fluid at the output such that the fluid flows through the channel towards the output.

2. The method of claim 1 wherein the step of generating the pressure gradient includes the steps of:

depositing a reservoir drop of fluid over the output of the channel of sufficient dimension to overlap the output; and sequentially depositing pumping drops of fluid at the input ports of the channel.

3. The method of claim 2 wherein:

the channel has a resistance;

each of the pumping drops has a radius and a surface free energy; and the reservoir drop has a height and a density such that the fluid flows through the channel at a rate according to the expression:

$$\frac{dV}{dt} = \frac{1}{Z}\left(\rho g h - \frac{2\gamma}{R}\right)$$

wherein: dV/dt is the rate of fluid flowing through the channel; Z is the resistance of the channel; ρ is the density of the reservoir drop; g is gravity; h is the height of the reservoir drop; γ is the surface free energy of the pumping drops; and R is the radius of the pumping drops.

4. The method of claim 1 wherein each of the pumping drops has a predetermined radius.

5. The method of claim 4 wherein the reservoir drop has a radius greater than the radii of the pumping drops.

6. The method of claim 1 wherein the output port has a radius and wherein the reservoir drop has a radius greater than the predetermined radius of the output of the channel.

7. The method of claim 1 wherein the output of the channel includes a plurality of output ports.

* * * * *